Feb. 18, 1941.  A. H. MYLES  2,232,255
SYNCHRONIZING CONTROL SYSTEM
Filed July 16, 1938  3 Sheets-Sheet 1

INVENTOR.
ASA H. MYLES
BY
John H. Leonard,
ATTORNEY.

Patented Feb. 18, 1941

2,232,255

UNITED STATES PATENT OFFICE 2,232,255

SYNCHRONIZING CONTROL SYSTEM

Asa H. Myles, Euclid, Ohio, assignor to The Electric Controller & Manufacturing Company, Cleveland, Ohio, a corporation of Ohio Application July 16, 1938, Serial No. 219,584

13 Claims. (Cl. 172—293)

This invention relates to electrical control systems, and particularly to systems for controlling the synchronization of dynamo electric machines having their secondary windings electrically interconnected such as are commonly referred to as "Selsyn" motors or "synchronous tie" motors.

If two or more asynchronous type alternating current dynamo electric machines having their primary windings connected to a common power source and their secondary windings electrically interconnected, are properly synchronized, they will remain in synchronism provided that the torque tending to hold them in synchronism is not exceeded. Machines connected in this manner have been utilized to insure that physically separated devices operate in unison. For example, they have been used to maintain in synchronism the motors driving the opposite ends of the moving bridges of cranes. Another example is their use in maintaining the asynchronous driving motors at the opposite ends of a lift bridge or dam gate in synchronism with each other so that the bridge or gate is at all times held level and thereby prevented from jamming in the guides.

The motors connected in this manner are known as synchronous tie motors or more simply as tie motors. The individual motors are referred to as transmitters or receivers depending upon whether the particular motor at the instant is transmitting or receiving torque. The torque which tends to hold the two tie motors in synchronism is hereinafter referred to as the tie torque.

To insure a balanced load and to prevent excessive noise and vibration it is necessary to excite large size tie motors with polyphase current. However, the use of polyphase current for this purpose has heretofore been unsatisfactory for many applications because of the unstable operation due to the rotating magnetic fields.

It is therefore an object of this invention to provide a control system for tie motors excited from a polyphase source and which system is stable in operation.

The tie motors which keep the driving motors at each end of a dam gate or similar load in step should at all times prevent one end of the gate or other load from moving ahead of the other end. Bringing such loads to a stopped position, while still maintaining both driving motors in exact synchronism, has heretofore presented a serious problem in both single and polyphase systems. If power is removed from both the driving motors and the tie motors and a mechanical brake applied, the entire load must be stopped by means of the mechanical brake alone. If there is any difference in brake operation, one end of the load will be stopped ahead of the other. This will cause the synchronous tie motors to be pulled out of position so that when polyphase power is again applied, the tie motors will not synchronize unless special precautions are taken. Even if the tie torque is maintained and the brakes applied after removal of power from the main motors, a high inertia load may cause the tie torque to be exceeded and the two dynamo electric machines to be pulled out of step, resulting in a high circulating current in the tie motor windings. If single phase excitation is used for synchronizing, or for both synchronizing and operation, and the brakes stop the system when the tie motors are approximately 180 electrical degrees out of synchronism, there will be little or no synchronizing torque when the single phase power is again applied, and the motors will not pull into step.

An object of this invention is to provide a method and means for synchronizing such tie motors with polyphase excitation in a manner to avoid the difficulties inherent in single phase excitation.

A further object of this invention is the provision of means for synchronizing synchronous tie motors while they are excited with polyphase current.

Again, it is obvious that if the two driving motors can be brought to rest uniformly, the tie motors can easily keep them in synchronism, since there will be no tendency to exceed the tie torque. If the tie motors are being driven against the rotating magnetic fields set up by the polyphase primary excitation, and if the induction motor speed-torque characteristics of the tie motors and of the driving motors are properly related, such uniform deceleration can be accomplished by adding a common secondary resistance across the interconnecting secondary leads. The two tie motors then act as induction motors having a tendency to reverse direction and thereby oppose the torque of the driving motors, and consequently cause rapid deceleration of the load. Each end of the load will be decelerated uniformly, and there will be no tendency for the two tie motors to pull out of step.

Accordingly, a further object of the invention is the provision of a method and a means for bringing two tie motors excited by polyphase current to a stop by electric braking action and without material tendency toward uneven deceleration.

As hereinbefore mentioned, polyphase excitation provides tie torque even though the two tie motors are 180 degrees out of synchronism. However, heretofore it has been impossible to utilize polyphase power to overcome this difficulty inherent with single phase excitation because of the tendency of polyphase excited tie motors to become unstable. If the tie motors are excited from a polyphase source, their torque-displacement angle characteristics are asymmetrical with respect to the zero angle or synchronous position. This difference in torque is due primarily to the fact that polyphase motors have a revolving magnetic field. This condition causes the torque to consist of two components, one of which is a synchronous component due to the rotor displacement, which acts to decrease the displacement angle, and the other of which is produced by rotor losses and acts in the direction of the revolving magnetic field. Therefore, there is more torque obtained from the tie motor acting as a receiver when working with the field rotation than is impressed on the tie motor acting as a transmitter and less torque obtained from the receiver when working against the field rotation than is impressed on the transmitter.

These torque relations cause an undesirable characteristic, in that, if the two dynamo electric machines are pulled out of step during operation or initially excited with polyphase power when the rotors are not in a synchronous position, the machines will tend to accelerate and run as induction motors. If both machines are free to rotate they will accelerate until they come into synchronism, and then will coast toward standstill. Near standstill they are apt to pull out of step and again accelerate as induction motors.

In order to eliminate this instability at the time excitation is applied, it has heretofore been necessary to first apply single phase power to the primary windings of both tie motors, and, after they have synchronized, to then apply polyphase excitation. It has also been suggested that three steps be used. In such case single phase power is first applied to two terminals of the primaries, the third terminals being open, then the third terminals are connected together, and, after a time delay, the third terminals are connected to the other terminal of the three phase source. Each of these procedures obviously necessitates the use of complicated switching apparatus, and neither will cause synchronization if the rotors are out of phase by 180 electrical degrees. Furthermore, the tie torque under single phase excitation is much less than that available if polyphase excitation is used, so that in using these systems maximum tie torque at starting is not available.

In most applications of synchronous tie motors to power loads each of the tie motors is mechanically coupled to driving motors of comparable horsepower ratings. In cases where polyphase excitation is used the direction of the rotating magnetic field of the tie motors is caused to be in a direction opposite to that of the tie motor rotor as driven by its associated driving motor, since it is under these conditions that a high value of tie torque is available at all speeds.

According to this invention, before polyphase power is supplied to the primary windings of the tie motors of a system such as just described, a resistance is connected across each of the phases of the interconnecting secondary windings of the tie motors. If polyphase power is then applied to the two tie motors and the two driving motors, the tie motors will act as two induction motors having a common secondary resistance, and, if it were not for the driving motors, would accelerate to their induction motor speed. However, since the rotating magnetic field of the tie motors is in a direction opposite to the intended direction of rotation of the driving motors, the tendency of the tie motors to accelerate will be opposed by a substantially equal motor torque and acceleration of the system cannot occur. If the tie motors are out of phase, one of the rotors or both will quickly move to a synchronous position since in addition to the normal secondary motor current, a circulating current between the transmitter and receiver rotors exists which has a synchronizing torque component. After the tie motors have been synchronized in this manner the common secondary resistance may be disconnected and the tie motors will maintain the system in synchronism as the system is accelerated by the driving motors.

Accordingly, further objects of this invention are to provide a simple, inexpensive means for accelerating polyphase tie motors in synchronism without first applying single phase power, and to provide an apparatus which may be utilized both to effect uniform braking action and to permit synchronization with polyphase excitation.

In the adaptation of synchronous tie motors to various applications, it has long been desired to be able to accelerate one tie motor to the proper speed and to synchronize it with another tie motor which is already rotating. For example, such a control system is useful in the operation of two conveyors which must move in synchronism with each other and in which one conveyor must run continuously while the other must be repeatedly started and stopped. In my copending application Serial No. 219,585, filed on the same date as this application, I have disclosed and claimed a control system for accomplishing this result using one driving motor and two tie motors.

This result may also be accomplished by driving one of the tie motors with a load driving motor and by accelerating the other tie motor by means of a load driving motor mechanically coupled thereto and adapted to be synchronized with the first motor. Before the second tie motor approaches the speed of the first tie motor, polyphase excitation may be applied to the primary windings of both tie motors. At the instant when the speeds of the two tie motors are equal, their secondary windings may be interconnected, and simultaneously a resistance connected in star or delta across the interconnecting secondary conductors. The addition of the resistance will cause the two tie motors to become induction motors and since they are being driven against their field rotation they will oppose the torque of the driving motors. If the rotors of the tie motors are out of phase at the instant of the interconnection of the rotor windings, the resulting circulating current will cause a synchronizing torque to exist and pull them into step at which time the resistance may be disconnected.

A further object of the invention, therefore, is to provide a method and means for synchronizing tie motors while they are rotating without resorting at all to single phase excitation.

Other objects and advantages will become apparent from the following specification wherein reference is made to the drawings, in which.

Figure 1:
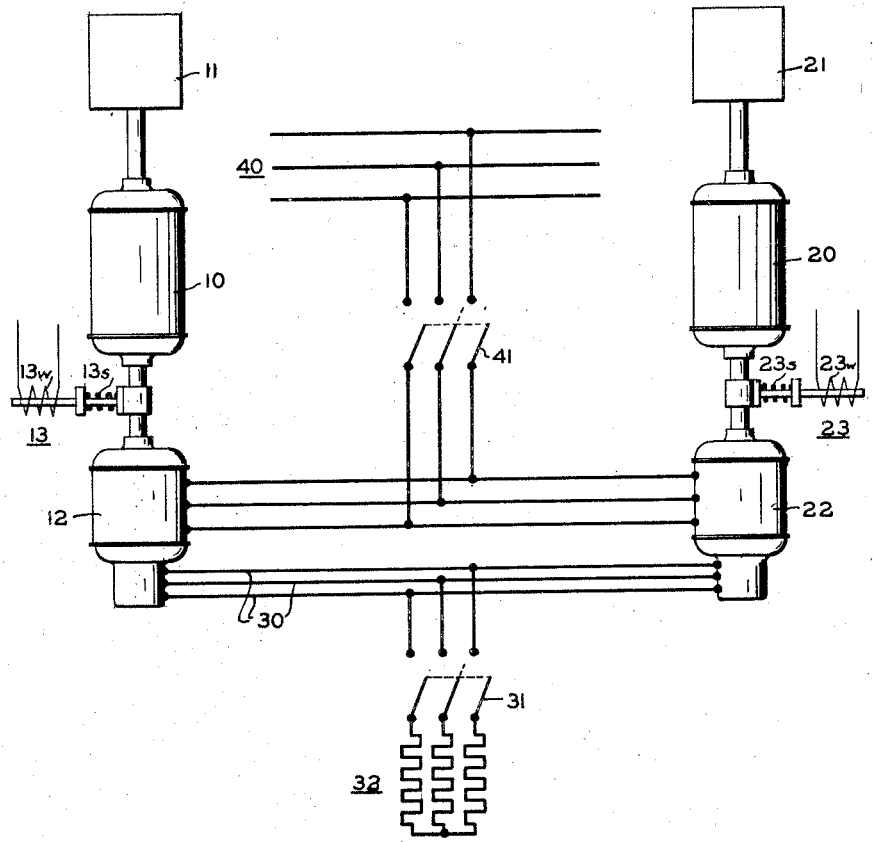
Fig. 1 is a diagrammatic illustration of the system of the present invention.

In Fig. 1, the motors 10 and 20 are drivingly connected to the loads 11 and 21, respectively, which loads must be kept in synchronism at all times. In order to maintain the motors 10 and 20 in synchronism and consequently the loads 11 and 21 in synchronism, two asynchronous dynamo electric machines or synchronous tie motors 12 and 22 are mechanically connected to motors 10 and 20 respectively so as to rotate in unison therewith and consequently in synchronism with the loads 11 and 21. The tie motors 12 and 22 have their secondary windings (not shown) electrically interconnected by means of the conductors 30 and their primary windings (not shown) connected to a polyphase source 40 through a knife switch 41. A knife switch 31 is provided to connect a portion of a resistance section 32 between each of the interconnecting secondary conductors 30. A star connection has been shown although a delta connection will serve in the same manner. The electromagnetic brakes 13 and 23 have operating windings 13w and 23w which when energized release the brakes and when deenergized permit the springs 13s and 23s to apply the brakes to stop or hold the loads 11 and 21.

The motors 10 and 20 and the tie motors 12 and 22 are preferably of the same type and horsepower rating, so that in event of failure of either one or both of the driving motors 10 and 20 the tie motors can still operate the load. Also the use of one type and size of motor provides certain economies. In order to carry out this invention it is only necessary that the tie motors have enough torque at all speeds to oppose the torque of the main motors to provide proper braking action and to permit synchronization with polyphase excitation.

Figure 4:
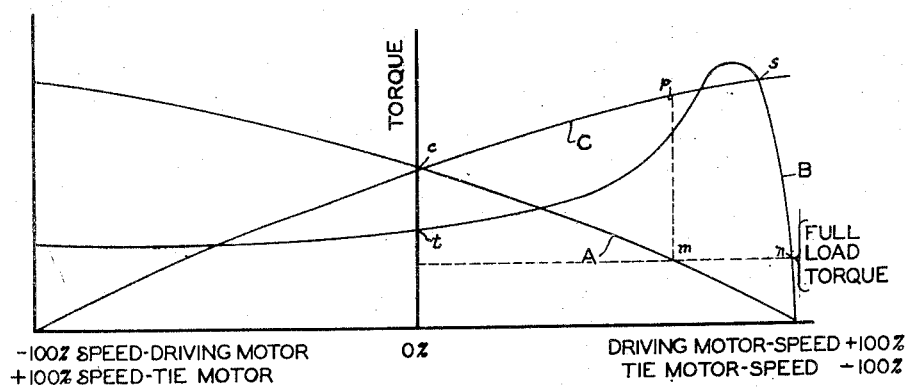
Fig. 4 is a graph showing relative torque outputs of the driving motors and the tie motors.

These torque relations are illustrated in Fig. 4 in which curve A is a typical speed-torque curve of a wound rotor induction motor having extra resistance inserted in its rotor circuit. Curve B is a speed-torque curve of the same induction motor with the extra resistance removed from the rotor circuit and is, of course, similar to the characteristic of a squirrel-cage induction motor. Curve C is the speed-torque curve of one of the tie motors when acting as an induction motor with the common resistance 32. Although shown as a positive torque for purposes of comparison, the torque of the tie motor is opposed to the torque of the driving motor.

Assuming that the tie motors are synchronized and the driving motors delivering full load torque, the speed of the system will be indicated by the point $n$ on the curve B. If extra resistance is now inserted in the rotor circuits of the driving motors, the speed of the system will be reduced to that indicated by the point $m$ on the curve A. The connection of a resistance across the interconnecting leads of the tie motors will cause them to act as induction motors and, being driven against their field rotation, will create a negative torque equal in magnitude to the ordinate of the point $p$. This preponderance of negative torque will cause the system to decelerate. At zero speed the torques of the driving motor and of the tie motor are equal and opposite, indicated by point $c$, and the system will therefore come to rest.

As is well known, the shape and position of these curves may be modified and changed merely by adding or removing secondary resistance. It is desirable, of course, to have the reverse torque of the tie motors in excess of the forward torque of the driving motors when braking is initiated, but to have them equal at zero speed. It is also obvious that even though the torques are not equal and opposite at zero speed, there will be no tendency for the system to accelerate unless the difference in torque is sufficiently great to overcome the inertia of the connected load.

If squirrel cage motors are used for the driving motors, satisfactory operation will result, although there will be a decrease in breaking torque at speeds slightly below full load speed due to the great increase in the torque of squirrel cage motors at this point, and there also will be a torque equal to the ordinate $ct$ tending to cause reversal after the system has decelerated to zero speed.

If the rotors of the tie motors 12 and 22 are in a synchronous position and the knife switch 41 closed, the rotors will remain stationary in synchronous position. If the rotor of either of the motors 12 or 22 is turned slightly the resulting unbalance will cause the rotor of the other machine to follow. Assume that the motors 10 and 20 are rotating and that they are driving their respective tie motors 12 and 22 in a direction either the same as or opposite to the field rotation set up by the closure of the knife switch 41. For any particular speed and direction of rotation there will be a resulting definite torque tending to hold the rotors of the tie motors 12 and 22, and consequently the driving motors 10 and 20, in synchronism. If this torque is exceeded, the tie motors will go out of step.

If the rotors of the tie motors 12 and 22 are not in their synchronous position when power is supplied to the primary windings by closure of the knife switch 41, and no torque is being exerted by the driving motors 10 and 20, the tie motors will accelerate towards the synchronous or zero angle position. The energy stored in each rotor is a function of the average torque and the displacement angle through which the rotor rotates in order to reach the zero position. If the torque-displacement angle characteristic is symmetrical, as when single phase excitation is used, the rotors will oscillate about the zero angle position until friction brings them to rest. If the torque-displacement angle characteristic is unsymmetrical as when polyphase excitation is used, the energy stored in one of the rotors as it moves towards the zero angle position may be greater than the energy that the rotor can give up in less than 180 electrical degrees movement on the other side of the zero angle position. In such case the rotor will slip a pole and motor action will result.

By connecting the resistance 32 across the interconnecting secondary leads 30 this instability may be avoided. With the resistance 32 properly connected and the direction of rotation of the rotating magnetic fields of the tie motors opposite to the direction of torque of the driving motors, if the rotors of the tie motors are out of step and polyphase power is applied to the primaries, one or the other or both will move towards synchronous position, there will be little tendency to move beyond the zero angle position, and the rotors will lock into step.

By means of the present invention electric braking action is provided, using the same equipment that is available for synchronizing purposes and without the necessity of plugging the driving motors. For this purpose also the tie motors 12 and 22 must be so connected that their rotors are driven against the field rotation set up by the excitation of the primary windings. Removing power from the motors 10 and 20 alone will cause the system to start to decelerate. If the switch 41 is left closed so as to maintain the primary excitation of the tie motors 12 and 22 and the knife switch 31 closed to connect the resistance 32 across the interconnecting leads 30, the tie motors 12 and 22 will become induction motors being driven against their field rotation, and a high tie torque, together with a strong braking action, will be present. Immediately therefore the tie motors will decelerate, and, since the rotors of the motors 10 and 20 are mechanically connected to the rotors of the tie motors 12 and 22, the system will be brought quickly to standstill, at which time the brakes 13 and 23 may be applied. Thus a system of electric braking is supplied with no extra equipment and which is effective to bring the load to rest without excessive wear on the mechanical brakes.

Braking action also may be obtained by leaving power on the motors 10 and 20 and so selecting the value of the resistance 32 that the induction motor torque of the tie motors 12 and 22 is sufficient to effectively oppose the torque of the motors 10 and 20 which may, of course, be slowed down by the insertion of secondary resistance, as explained in connection with Fig. 4. In this case the system will decelerate and come to rest with no great tendency to reverse direction upon reaching standstill.

With this manner of braking, the system actually comes to a stalled condition before reversing direction, whereas if the driving motors were plugged the system would rapidly pass through the zero speed position and accelerate in the reverse direction. The stalled condition which is obtainable with the system of braking herein disclosed permits to a greater advantage the use of a zero speed switch to remove the power at zero speed and also permits greater accuracy in stopping under manual control.

A serious disadvantage of any control system adapted for plugging a motor is that if one of the directional contactors fails to open the others cannot close and no braking action will result. By means of this invention this disadvantage is eliminated since here if the directional contactors fail to open, the system will stop as long as a switch is closed to insert the common secondary resistance.

Figure 2:
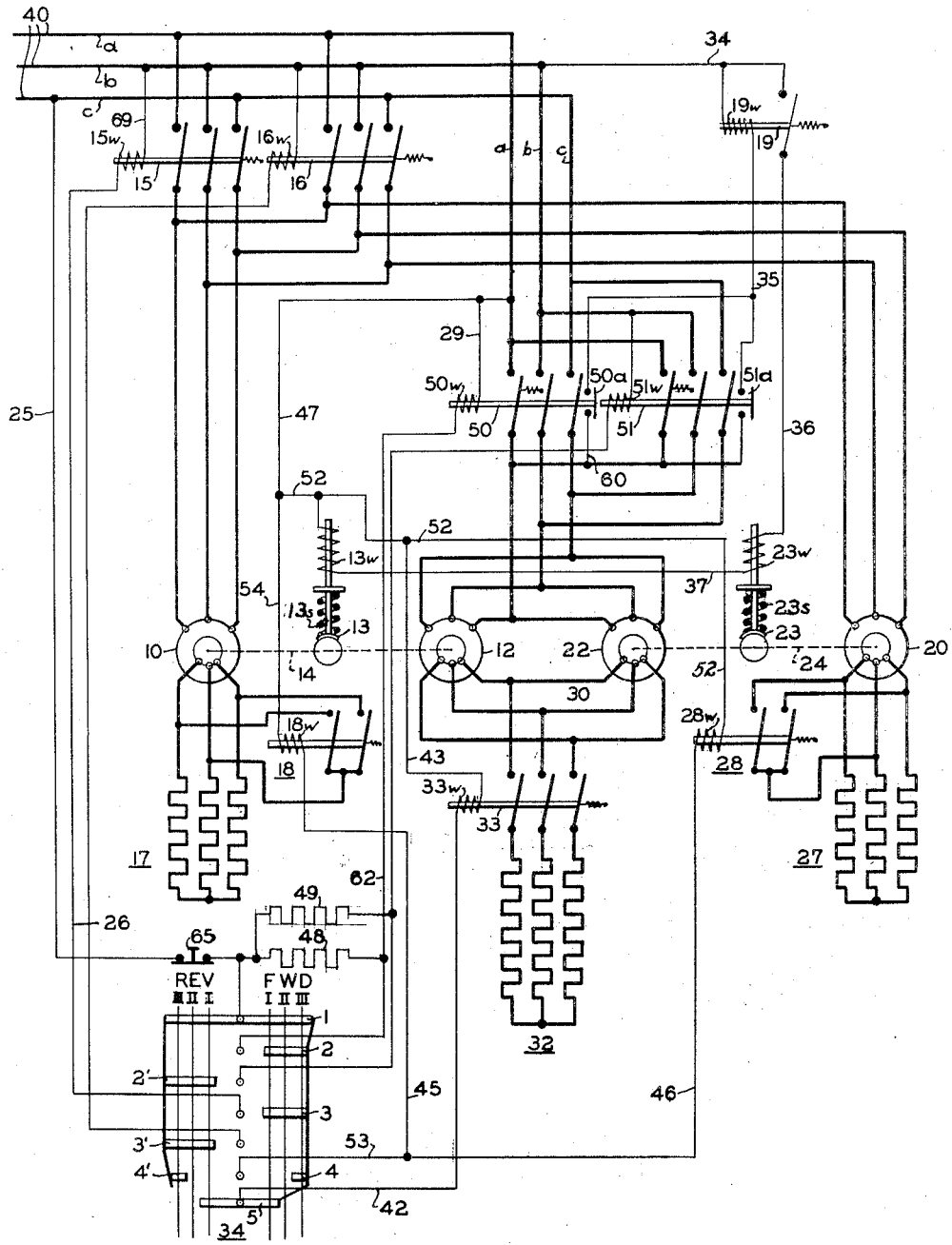
Fig. 2 is a wiring diagram showing the application of this invention for controlling the acceleration and stopping of a complete synchronous tie system using a manually-operated master switch.

In Fig. 2 the electromagnetic contactors 15 and 16 are provided to connect the primary windings of the motors 10 and 20 to the polyphase source of power 40 represented as a three phase source having three conductors a, b and c. The contactor 15 has an operating winding 15w and its contacts are arranged to connect the motors 10 and 20 to the source 40 so as to cause rotation of both of the motors 10 and 20 in the forward direction. The contactor 16 has an operating winding 16w and has contacts which are arranged to connect the motors 10 and 20 to the source 40 so as to cause rotation of both of the motors 10 and 20 in the reverse direction. The contactors 50 and 51 have operating windings 50w and 51w, respectively, and are provided to control the direction of rotation of the revolving magnetic fields of the tie motors 12 and 22. The auxiliary contacts 50a and 51a on contactors 50 and 51 respectively are provided to control the operation of a contactor 19. The rotors of the motors 10 and 20 are mechanically connected to the rotors of the tie motors 12 and 13 as by means of the shafts 14 and 24 respectively. Preferably the contactors 15, 16, 50 and 51 should be so interlocked that when the motors 10 and 20 are rotating in the forward direction the rotors of the tie motors 12 and 22 are rotating against their field rotation and likewise when the motors 10 and 20 are rotating in the reverse direction the rotors of the tie motors 12 and 22 are also rotating against their field rotation.

The resistance sections 17 and 27 control the acceleration and speed of the motors 10 and 20 respectively. The electromagnetic contactors 18 and 28, having operating windings 18w and 28w, respectively, are arranged to short-circuit the resistance sections 17 and 27 respectively, in order to permit the motors 10 and 20 to rotate at their maximum speed.

An electromagnetic contactor 33 having an operating winding 33w is provided to connect the resistance 32 across the interconnecting conductors 30 of the tie motors 12 and 22. The energization of the electromagnetic brakes 13 and 23 is controlled by the electromagnetic contactor 19 which has an operating winding 19w. The brakes 13 and 23 have operating windings 13w and 23w which when energized release the brakes against the pressure of the springs 13s and 23s.

A master switch 34 having three positions in each of the forward and reverse directions is provided for selectively controlling the operation of the system. Two resistances 48 and 49 are also provided to complete circuits to the operating windings 50w and 51w independently of the master switch 34. The ohmic value of each of the resistances 48 and 49 is such that the respective windings 50w and 51w will not be energized sufficiently through the resistance to close their respective contactors 50 and 51, but will be sufficiently energized to hold their respective contactors closed after they have been closed by energization of the windings 50w and 51w through the master switch. A normally closed push button 65 is provided to permit deenergization of the windings 50w and 51w.

The various segments 1 to 5 and 2' to 4' of the master switch 34 are arranged to connect the control circuits in a manner now to be described.

With power supplied from the source 40 and the master switch 34 in the off position the operating winding 33w is energized over a circuit which may be traced from the conductor c through a conductor 25, the push button 65, the segment 1 of the master switch 34, the segment 5, a conductor 42, the winding 33w, a conductor 43, a conductor 52 and a conductor 47 to the conductor a. The contactor 33 in response to the energization of its operating coil 33w closes its contacts to connect the resistance 32 across the interconnecting secondary conductors 30.

To prepare for operation in the forward direction the master switch 34 is moved to the right to the first position which will cause the energization of the operating coil 50w and the consequent closure of the main contacts of the contactor 50. The circuit through the operating coil 50w may be traced from conductor c, through the conductor 25, the push button 65, the segment 1 of the master switch 34, the segment 2, a conductor 62, the operating coil 50w, and the conductor 29 to the conductor a. The closure of the contactor 50 supplies power to the primary windings of the tie motors 12 and 22. The winding 33w of the contactor 33 remains energized and the resistance 32 remains connected across the interconnecting secondary conductors 30.

Also on the first point forward of the master switch 34 a circuit is completed for the operating coil 15w of the contactor 15 which circuit is readily traced from the conductor c, through the conductor 25, the push button 65, the segment 1, the segment 3, a conductor 26, the winding 15w and a conductor 69 to the conductor b. The contactor 15 in response to energization of its operating winding 15w closes its contacts to connect the primary windings of the motors 10 and 20 to the source of supply 40 in a manner tending to cause rotation in the forward direction.

The closing of the auxiliary contacts 50a of the contactor 50 completes an energizing circuit for the operating coil 19w of the contactor 19, which circuit is readily traced from the conductor b, through a conductor 34, the operating winding 19w, a conductor 35, the contacts 50a and a conductor 60 to the conductor a. The contactor 19 in response to energization of its operating coil 19w closes its contacts to complete a circuit to the operating coils 13w and 23w of the electromagnetic brakes 13 and 23 which are thereby released. The operating circuit for the brakes is readily traced from the conductor b, through the conductor 34, the closed contacts of the contactor 19, a conductor 36, the coil 23w, a conductor 37, the coil 13w, the conductor 52 and the conductor 47 to the conductor a.

The tie motors 12 and 22 are synchronized by means of the resistance 32 which is connected across their respective secondary windings, which causes them to act as induction motors and oppose the torque of the driving motors 10 and 20. Since the torque of the driving motors 10 and 20 with the resistances 17 and 27 connected in their respective secondary circuits are approximately equal and opposite to the induction motor torques of the tie motors 12 and 22 with the common resistance 32 in their secondary circuits, the system will not accelerate. A synchronizing torque will be present, however, and cause the rotors of the tie motors to move to a synchronous position. When the rotors of the tie motors are in their synchronous position the torque of each tie motor will still be opposing the torque of its associated driving motor and the system will remain at rest. Even though polyphase power has been initially applied to the primary winding of the tie motors, the system has synchronized with no tendency to become unstable.

After the tie motors 12 and 22 have been properly synchronized the motors 10 and 20 may be accelerated by moving the master switch 34 to the second position. This movement interrupts the circuit through the coil 33w of the contactor 33, which opens its contacts to disconnect the resistance 32 from the interconnecting secondary conductors 30. As a result, the tie motors 12 and 22 no longer act as induction motors, and the motors 10 and 20 accelerate in a forward direction with the resistances 17 and 27 connected in their respective rotors and are maintained in synchronism by the tie torque of the tie motors 12 and 22.

In the third position in the forward direction, the master switch 34 completes a circuit to the operating windings 18w and 28w of the electromagnetic contactors 18 and 28. The contactors 18 and 28 in response to the energization of their operating coils close their contacts to short circuit resistance sections 17 and 27 respectively. The motors 10 and 20 then accelerate to their normal speed. The energizing circuits for the operating coils 18w and 19w may be readily traced from conductor c, through conductor 25, the segment 1, the segment 4, a conductor 53, the conductors 45 and 46 in parallel, the operating coils 18w and 28w, the conductors 52 and 54 to the conductor 47, and the conductor 47 to the conductor a.

When it is desired to stop the system after rotation in the forward direction, the master switch 34 is moved to the off position. The energizing circuit for the coils of the contactors 15, 18 and 28 is thereby interrupted and the circuit to the operating coil of the contactor 33 is again completed. As a result, the contactor 33 closes its contacts to reconnect the resistance 32 across the interconnecting conductors 30.

The operating winding 50w of the contactor 50 remains energized through a circuit which may be readily traced from the conductor a, the conductor 29, the coil 50w, the conductor 62, the resistance 48, the push button 65, and the conductor 25 to the conductor c. The contactor 50 thus remains closed and maintains the energization of the primary windings of the tie motors 12 and 22, and the windings 13w and 23w of the brakes 13 and 23 by means of the auxiliary contacts 50a and the contactor 19.

Since the tie motors 12 and 22 are rotating against their field rotation as a result of being driven by the motors 10 and 20 in that direction, they now become induction motors tending to reverse direction, and since they are coupled directly to the motors 10 and 20, the latter also tend to reverse direction. Thus the system is gradually and uniformly brought to a standstill at which point the push button 65 may be opened to deenergize the operating winding 50w of the contactor 50 and to deenergize the operating coil 19w of the contactor 19, which will open its contacts to interrupt the circuit of the operating coils 13w and 23w of the brakes 13 and 23. The brakes 13 and 23 will be applied to hold the system in the standstill position.

For operation of the system in the reverse direction the master switch 34 may be moved to the left and similar circuits to those just described will be set up to cause operation of the contactors 16, 18, 28, 33 and 51.

The operation of the system has been described by stating that power is removed from the motors 10 and 20 during the braking operation. Instead of removing power from the motors 10 and 20 the torque output and speed thereof may be reduced by inserting the resistances 17 and 27 into the rotor circuit. The value of the resistance 32 can then be selected so that the induction motor torque of the tie motors 12 and 22 will be greater than the torque of the motors 10 and 20 over a sufficient range to cause a gradual deceleration of the system, as heretofore explained in connection with Fig. 4.

It will be obvious to those skilled in the art that various time delay arrangements can be provided to control the switching sequence in response to movements of the master switch 34, so that it may be moved quickly from the off to the third position forward or reverse or from the third position in one direction to the third position in the other direction and the result in switching operation delayed sufficiently to provide proper acceleration.

Figure 3:
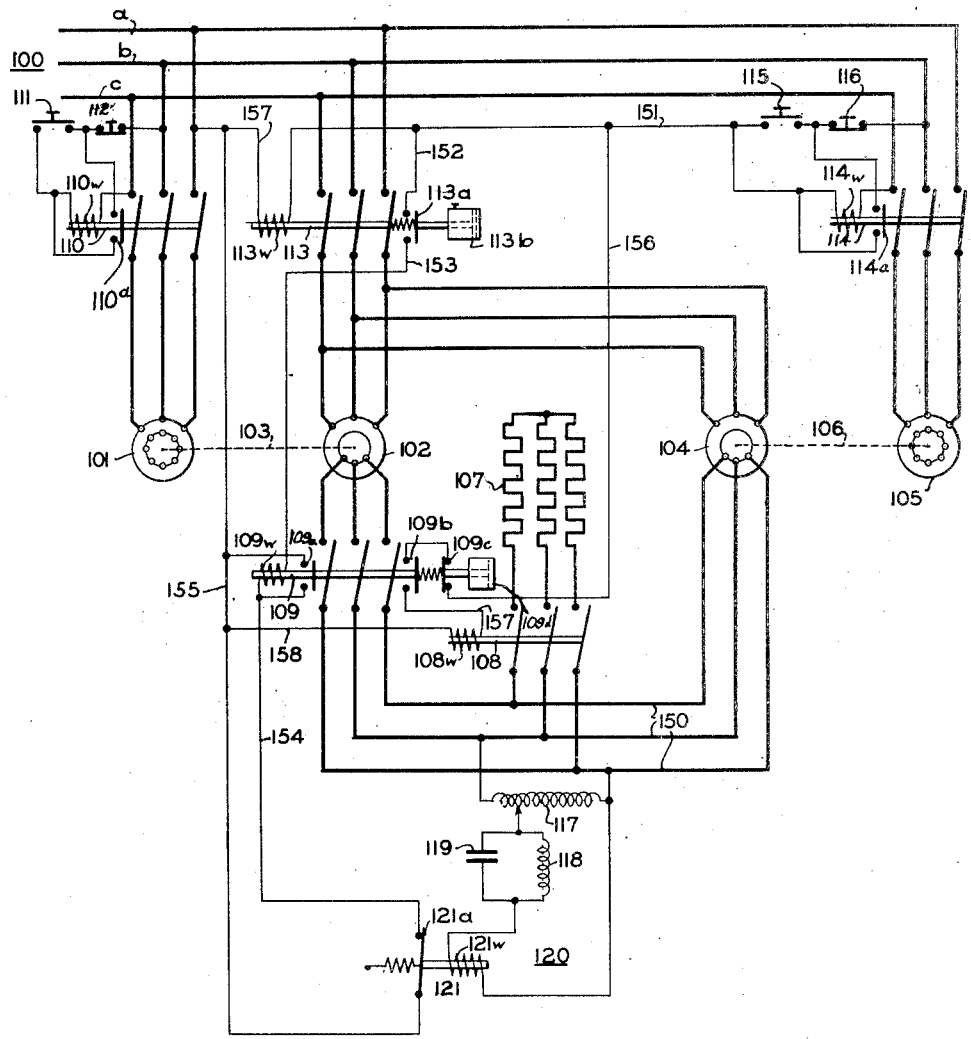
Fig. 3 is a wiring diagram showing an automatic system for synchronizing the two tie motors while they are rotating.

In the embodiment of the invention shown in Fig. 3, a driving motor 101, illustrated as of the squirrel-cage type, is mechanically coupled to a tie motor 102 by means of a shaft 103. A second driving motor 105 is mechanically coupled to another tie motor 104 by means of a shaft 106. The speed torque characteristics of the driving motors 101 and 105 and of the tie motors 102 and 104 when running as induction motors with a common secondary resistance should be such that at the normal speed of the driving motor 101 the opposing torques will cause a braking action to take place and consequent synchronization to occur.

An electromagnetic contactor 110 having an operating winding 110w and an auxiliary contact 110a is arranged to connect the motor 101 to the source of power 100. The operation of the contactor 110 is controlled by means of the two push buttons 111 and 112. An electromagnetic contactor 114 having an operating winding 114w and an auxiliary contact 114a is arranged to connect the motor 105 to the source of power 100. The operation of the contactor 114 is controlled by means of the two push buttons 115 and 116.

To connect the primary windings of the tie motors 102 and 104 to the source of power 100, an electromagnetic contactor 113 having an operating winding 113w and an auxiliary contact 113a, is provided. The auxiliary contact 113a is arranged to close a predetermined interval after the winding 113w is energized, the interval being obtainable by use of any suitable time delay arrangement illustrated as a dash pot 113b.

The interconnecting secondary conductors 150 are arranged to be connected together by means of an electromagnetic contactor 109 having an operating winding 109w and normally-opened auxiliary contacts 109a and 109b and normally-closed auxiliary contacts 109c, the latter adapted to open a predetermined interval after the energization of the winding 109w. A dash pot 109d is illustrated as providing this time delay in a well-known manner. Energization of the winding 109w is controlled by means of a relay circuit 120 which may be connected across any two of the interconnecting secondary conductors 150. The relay circuit 120 comprises an auto transformer 117 and a parallel resonant circuit including a condenser 119 and an inductive reactance 118. In series with the parallel resonant circuit is a winding 121w of the relay 121 whose contacts control the energization of the winding 109w. This relay circuit is described and claimed in my copending application Serial No. 266,623, filed April 7, 1939, and which is a division of my aforementioned copending application. To connect the resistance 107 across the interconnecting conductors 150 an electromagnetic contactor 108 having an operating winding 108w is provided.

Operation of the push button 111 completes an obvious circuit from one phase of the source 100 to the operating winding 110w of the contactor 110 which as a result closes its contacts to connect the motor 101 to the source of power 100. When the motor 101 is driving its associated load and its associated tie motor 102 and it is desired to synchronize therewith the load driven by the motor 105, the push button 115 may be operated. Operation of the push button 115 completes an obvious circuit from one phase of the source 100 to the operating winding 114w of the contactor 114, which as a result closes its contacts to connect the motor 105 to the source of power 100. At the same time the coil of the contactor 113 is energized over a circuit extending from the conductor b, through the push buttons 116 and 115, a conductor 151, the winding 113w, and the conductor 157 to the conductor a, and, as a result, the contactor 113 closes its contacts to provide excitation for the tie motors 102 and 104. As soon as the primary winding of the tie motor 104 is excited the relay circuit 120 is energized to open the contacts of the relay 121, thus preventing the closure of the contactors 109 and 108 at this time. The windings 114w and 113w are maintained energized upon release of the push button 115 over obvious circuits through the auxiliary contacts 114a, and the winding 110w is maintained energized upon release of the push button 111 over an obvious circuit through the auxiliary contacts 110a.

When the speed of the tie motor 104 approaches that of the tie motor 102, the electrical characteristics of the relay circuit 120 are such that the current in the relay circuit 120 will decrease suddenly so that the winding 121w will be deenergized and permit the relay 121 to close its contacts to complete a circuit extending from the conductor b through the push button 116, the contacts 114a, the conductor 151, the conductor 152, the contacts 113a, the conductor 153, the winding 109w, the conductor 154, the contacts 121a, and the conductor 155 to the conductor a. The response of the relay circuit 120 is due to the phenomenon of series-parallel resonance. At a predetermined frequency, the condenser 119 and the relay coil 121 are in a series-resonant condition, and at a frequency one or two cycles per second less the condenser 119 and the inductance 118 are in a parallel resonant condition. As a result, the current in the operating winding 121w decreases suddenly at the predetermined frequency.

The contactor 109 in response to the energization of its operating winding 109w connects together the secondary windings of the tie motors 102 and 104.

The operation of the contactor 109 also completes a circuit from the conductor b, through the contacts 114a, the conductors 151 and 156, the normally-closed contacts 109c, not yet open because of the dash pot 109d, the now closed contacts 109b, the conductor 157, the winding 108w, the conductor 158 and the conductor 155 to the conductor a. The contactor 108 in response to the energization of its operating winding 108w closes its contacts to connect the resistance 107 across the interconnecting secondary conductors 150.

The entire system immediately starts to decelerate and due to the presence of a synchronizing torque is thereupon synchronized. After the system has synchronized the auxiliary contacts 109c will open and the operating winding 108w will be deenergized to permit the opening of the contactor 108 and the consequent disconnection of the resistance 107 from the circuit. The system will then accelerate to its normal speed in a synchronous condition.

In order to prevent the opening of relay 121 as the system decelerates prior to its synchronization, the contacts 109a by-pass the contacts 121a. The contacts 113a are shown as of a time delay type to prevent any fluttering of the contactor 109 which might otherwise result if the relay 121 was not quick enough in its initial response when power is first applied to the tie motors 102 and 104.

Other speed or frequency responsive relays or relay circuits might be used instead of the relay circuit 120, but it was found that the series-parallel resonance phenomena gave more definite and certain operation due to the steep drop in relay current at the preselected frequency and also due to the fact that at higher frequencies a large relay current is present, resulting in a definite pick-up.

I claim:

1. In a system including a pair of dynamo-electric machines each having a pair of inductively related windings, electrical conductors interconnecting a winding of one of said machines and a winding of the other of said machines, and means for connecting each of the other windings to a source of polyphase power whereby rotating magnetic fields are produced in said machines, respectively; the combination with extraneous means tending to rotate each dynamo-electric machine in a direction opposed to the direction of rotation of its said rotating magnetic field, of means connecting each of said conductors to each other, whereby said machines are brought to synchronous position.

2. In an electrical system including a pair of dynamo-electric machines each having a pair of inductively related windings and one of each pair being rotatable, electrical connections between a winding of one of said machines and a winding of the other of said machines, and means for connecting each of the other windings to a source of polyphase power whereby rotating magnetic fields are produced in the machines, respectively; the combination with extraneous means tending to rotate each of the machines in a direction opposite to that of its rotating magnetic field, of resistance means connected across said electrical connections, whereby said machines are caused to assume a synchronous position, and means to disconnect said resistance means whereby the system accelerates under the control of the machines.

3. The combination with a pair of dynamo-electric machines each having a pair of inductively related windings, electrical connections between a winding of one of said machines and a winding of the other of said machines, means for connecting each of the other windings to a source of polyphase power to set up rotating magnetic fields, and means operative to rotate each dynamo electric machine in a direction opposite to that of their associated rotating magnetic fields, of resistance means connected across said electrical connections.

4. A synchronizing control system comprising a pair of dynamo electric machines, each having a pair of inductively related windings, electrical connections between a winding of one of said machines and a winding of the other of said machines, means for connecting each of the other windings to a source of polyphase power to set up rotating magnetic fields, and extraneous means tending to rotate each of the windings which are electrically interconnected by said electrical connections in a direction opposite to said rotating magnetic field, resistance means, and means for connecting said resistance means across said electrical connections, whereby said dynamo electric machines become synchronized, and for disconnecting said resistance means whereby the system is accelerated by the extraneous means under the control of the dynamo electric machines.

5. The method of synchronizing a pair of dynamo electric machines, each having a pair of inductively related windings, in which one winding of each machine is electrically interconnected with a winding of the other machine through electrical conductors, which comprises initially exciting a winding of one machine and a winding of the other machine with polyphase current to set up a rotating magnetic field in each machine, concurrently urging the winding of each machine, which is not producing said rotating magnetic field to rotate in a direction opposite to that of its associated rotating magnetic field, concurrently electrically connecting the said conductors to each other through resistance means, and subsequently disconnecting the said conductors from each other and said resistance means.

6. In a motor control system including two load driving motors, the combination with two wound-rotor dynamo-electric machines, excited from a source of polyphase power, said excitation setting up a rotating magnetic field in each machine, each machine having its rotor mechanically connected to one of the load driving motors to be rotated therewith in opposition to said rotating magnetic field, and conductors for electrically interconnecting the rotor windings, of common resistance means connected between the interconnecting conductors.

7. The method of synchronizing a pair of dynamo electric machines, each having a pair of inductively related windings, in which one winding of each machine is electrically interconnected with a winding of the other machine through electrical conductors, which comprises initially exciting the windings of each machine which are not electrically interconnected with a polyphase current to set up a rotating magnetic field in each machine, concurrently urging a winding of each machine to rotate in a direction opposite to that of its associated rotating magnetic field, and concurrently electrically connecting each of said conductors to the others while maintaining said polyphase excitation.

8. In a synchronizing system, a pair of dynamo-electric machines each having a pair of inductively related windings, means for connecting a winding of each machine to a source of polyphase power to create a revolving magnetic field in each machine, extraneous means operative to rotate each of said machines in a direction opposite to that of its rotating magnetic field, a resistance means, means responsive to the speed of one of said machines to electrically interconnect through electrical conductors the windings of said machines which are not connected to the source of power, and, concurrently, to connect said resistance means across said electrical conductors, and means operable a predetermined time after the response of said last named means to disconnect said resistance means.

9. The method of synchronizing a pair of polyphase excited tie-motors while they are being driven against the direction of their rotating magnetic fields by extraneous means, and which comprises interconnecting the secondary windings of said machines through electrical conductors when the speeds of said machines are equal, concurrently connecting each of said conductors to the others, whereby the machines will synchronize while they are rotating if the connection of the conductors to each other is maintained for a sufficient interval, maintaining said connection until the machines synchronize, and subsequently disconnecting each of said conductors from the others.

10. The method of braking a pair of co-rotating machines each of which is driving a different one of a pair of polyphase excited dynamo electric machines in the direction opposite to the rotating magnetic field created by said polyphase excitation of the dynamo electric machine when said dynamo electric machines have their secondary windings electrically interconnected through electrical conductors and thereby maintain said co-rotating machines in synchronism, which comprises the step of electrically connecting each of said electrical conductors to the others while maintaining said polyphase excitation.

11. A system according to claim 1 and further characterized in that the means which connects each conductor to the others includes a resistance means in the conducting path.

12. The method according to claim 7, characterized in the added step of effecting said electrical connection of said conductors through a resistance.

13. The method according to claim 9, characterized further in that said connection of each conductor with the others is effected through a resistance.

ASA H. MYLES.